US009894626B2

(12) United States Patent
Abedini et al.

(10) Patent No.: US 9,894,626 B2
(45) Date of Patent: Feb. 13, 2018

(54) SECONDARY SYNCHRONIZATION SIGNALS FOR A SYNCHRONIZATION CHANNEL

(71) Applicant: QUALCOMM Incorporated, San Diego, CA (US)

(72) Inventors: Navid Abedini, Raritan, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 14/918,748

(22) Filed: Oct. 21, 2015

(65) Prior Publication Data

US 2016/0374034 A1 Dec. 22, 2016

Related U.S. Application Data

(60) Provisional application No. 62/181,757, filed on Jun. 18, 2015.

(51) Int. Cl.
*H04W 56/00* (2009.01)
*H04J 11/00* (2006.01)
*H04L 29/08* (2006.01)

(52) U.S. Cl.
CPC ....... *H04W 56/001* (2013.01); *H04J 11/0069* (2013.01); *H04J 11/0073* (2013.01);
(Continued)

(58) Field of Classification Search
CPC ............... H04W 56/001; H04J 11/0073; H04J 11/0076; H04J 2011/0096; H04L 67/12
See application file for complete search history.

(56) References Cited

U.S. PATENT DOCUMENTS 7,808,967 B2 10/2010 Han et al.
8,665,799 B2 3/2014 Malladi et al.
(Continued)

OTHER PUBLICATIONS

ISA/EP, International Search Report and Written Opinion of the International Searching Authority, Int'l Application No. PCT/US2016/031512, Sep. 14, 2016, European Patent Office, Rijswijk, NL, 13 pgs.
(Continued)

*Primary Examiner* — Jamal Javaid
(74) *Attorney, Agent, or Firm* — Holland & Hart LLP

(57) ABSTRACT

Methods, systems, and devices are described for wireless communication. The method may include determining, at a wireless device, a logical identifier (ID) as a pseudo-random function of a physical device ID of the wireless device and a synchronization channel index, where the synchronization channel index corresponds to an instance of a periodically repeating synchronization channel in a radio frame. The wireless device may be a base station in a serving cell, such that the synchronization channel may be to synchronize a downlink to communicate with a user equipment (UE) operating in a narrow-band cellular internet of things. The method may also include generating a secondary synchronization signal (SSS) for each instance of the periodically repeating synchronization channel in the frame based at least in part on the logical ID and the corresponding synchronization channel index, and transmitting the frame from the wireless device.

30 Claims, 13 Drawing Sheets

(52) U.S. Cl.
CPC .......... *H04J 11/0076* (2013.01); *H04L 67/12* (2013.01); *H04J 2011/0096* (2013.01)

(56) References Cited

U.S. PATENT DOCUMENTS

| | | |
|---|---|---|
| 8,768,359 B2 | 7/2014 | Luo et al. |
| 8,995,300 B2 | 3/2015 | Dinan |
| 2008/0080463 A1* | 4/2008 | Stewart ................ H04J 11/0069 370/342 |
| 2013/0343318 A1* | 12/2013 | Gruet ...................... H04L 5/001 370/329 |
| 2014/0056220 A1 | 2/2014 | Poitau et al. |

OTHER PUBLICATIONS

LG Electronics, "On the Design of D2DSS and PD2DSCH," 3GPP TSG RAN WG1 Meeting #76, R1-140839, Prague, Czech, Feb. 10-14, 2014, 8 pgs., XP_050752309, 3rd Generation Partnership Project.

LG Electronics, "Text Proposal on Coverage Enhancement for a MTC UE," 3GPP TSG RAN WG1 Meeting #72, R1-130264, St. Julian's, Malta, Jan. 28-Feb. 1, 2013, 7 pgs., XP_050663396, 3rd Generation Partnership Project.

Motorola, "Scrambling Method for Two S-SCH Short Code," 3GPP TSG RAN WG1 Meeting #49bis, R1-072661, Orlando, FL, Jun. 25-29, 2007, 4 pgs., XP_050106359, 3rd Generation Partnership Project.

Texas Instruments, "Secondary SCH Mapping and Scrambling," 3GPP TSG RAN WG1 Meeting #50, R1-073434, Athens, Greece, Aug. 20-24, 2007, 4 pgs., XP_050107049, 3rd Generation Partnership Project.

* cited by examiner

SECONDARY SYNCHRONIZATION SIGNALS FOR A SYNCHRONIZATION CHANNEL

CROSS REFERENCES

The present application for Patent claims priority to U.S. Provisional Patent Application No. 62/181,757 by Abedini et al., entitled "Secondary Synchronization Signals For a Synchronization Channel," filed Jun. 18, 2015, assigned to the assignee hereof, and expressly incorporated by reference herein.

BACKGROUND

The following relates generally to wireless communication, and more specifically to generating secondary synchronization signals for a synchronization channel in a cellular internet of things (CIoT) system.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE). Some of these UEs may be wireless devices that are part of a CIoT system, including those wireless devices implementing Machine-to-Machine (M2M) communication or Machine Type Communication (MTC).

Wireless devices in a CIoT system generally synchronize with another wireless device in order to communicate with that device. A synchronization channel, which may be transmitted periodically in a frame, may be used for such synchronization between the wireless devices. For example a base station, operating as a serving cell, may periodically transmit a synchronization channel that is intended for receipt by a UE that intends to synchronize with the base station. The UE may then determine synchronization information from the synchronization channel, for example to achieve frame, subframe, slot, and/or symbol synchronization with the base station. However, a wireless device attempting to detect a synchronization channel may misdetect a synchronization channel, for example where overlapping synchronization channel transmissions are received from neighboring wireless devices. For example, two neighboring base stations may transmit overlapping synchronization channels when received by the UE, resulting in a misdetection of all or a portion of the synchronization channel by the UE. Misdetection of all or portions of the synchronization channel may result in performance degradation, for example due to synchronization latency.

SUMMARY

Systems, methods, and apparatuses for providing a synchronization channel including secondary synchronization signals are described. The method may include determining, at a wireless device, a logical identifier (ID) as a pseudo-random function of a physical device ID of the wireless device and a synchronization channel index, where the synchronization channel index corresponds to an instance of a periodically repeating synchronization channel in a radio frame. The wireless device may be a base station in a serving cell, such that the synchronization channel may be to synchronize a downlink to communicate with a user equipment (UE) operating in a narrow-band cellular internet of things. The wireless device may also be a user equipment or other wireless device operating in a cellular internet of things, such that the synchronization channel may be to synchronize an uplink to communicate with a base station. The method may also include generating a first secondary synchronization signal (SSS) for each instance of the periodically repeating synchronization channel in the frame based at least in part on the logical ID and the corresponding synchronization channel index, and transmitting the frame from the wireless device. The first SSS may be generated by calculating a first SSS ID ($SSS_{id1}(X, p)$) using the synchronization channel index, number of instances of the periodically repeating synchronization channel in the frame, the number of different possible sequences for $SSS_{id1}(X, p)$, and the logical ID associated with $SSS_{id1}(X, p)$. The method may also include generating a second SSS for each instance of the periodically repeating synchronization channel based at least in part on the logical ID and the corresponding synchronization channel index. The second SSS may be generated by calculating a second SSS ID ($SSS_{id2}(X, p)$) using the synchronization channel index, number of instances of the periodically repeating synchronization channel in the frame, the number of different possible sequences for $SSS_{id2}(X, p)$, and the logical ID associated with $SSS_{id2}(X, p)$. In addition to the first SSS and second SSS, the synchronization channel may include one or more primary synchronization signals (PSSs).

A method of wireless communication is described. The method may include determining, at a wireless device, a logical ID as a pseudo-random function of a physical device ID of the wireless device and a synchronization channel index, wherein the synchronization channel index corresponds to an instance of a periodically repeating synchronization channel in a frame, generating a first secondary synchronization signal (SSS) for each instance of the periodically repeating synchronization channel in the frame based at least in part on the logical ID and the corresponding synchronization channel index, and transmitting the frame from the wireless device.

An apparatus for wireless communication is described. The apparatus may include means for determining, at a wireless device, a logical ID as a pseudo-random function of a physical device ID of the wireless device and a synchronization channel index, wherein the synchronization channel index corresponds to an instance of a periodically repeating synchronization channel in a frame, means for generating a first secondary synchronization signal (SSS) for each instance of the periodically repeating synchronization channel in the frame based at least in part on the logical ID and the corresponding synchronization channel index, and means for transmitting the frame from the wireless device.

A further apparatus for wireless communication is described. The apparatus may include a processor, memory in electronic communication with the processor, and instructions stored in the memory and operable, when executed by the processor, to cause the apparatus to determine, at a wireless device, a logical ID as a pseudo-random function of a physical device ID of the wireless device and a synchronization channel index, wherein the synchronization channel index corresponds to an instance of a periodically repeating synchronization channel in a frame, generate a first secondary synchronization signal (SSS) for each instance of the periodically repeating synchronization channel in the frame based at least in part on the logical ID and the corresponding synchronization channel index, and transmit the frame from the wireless device.

A non-transitory computer-readable medium storing code for wireless communication is described. The code may include instructions executable to determine, at a wireless device, a logical ID as a pseudo-random function of a physical device ID of the wireless device and a synchronization channel index, wherein the synchronization channel index corresponds to an instance of a periodically repeating synchronization channel in a frame, generate a first secondary synchronization signal (SSS) for each instance of the periodically repeating synchronization channel in the frame based at least in part on the logical ID and the corresponding synchronization channel index, and transmit the frame from the wireless device.

In some examples of the method, apparatuses, or non-transitory computer-readable medium described herein, the wireless device is a base station and the periodically repeating synchronization channel is a downlink synchronization channel. Additionally or alternatively, some examples may include processes, features, means, or instructions for generating a second SSS for each instance of the periodically repeating synchronization channel in the frame based at least in part on the logical ID and the corresponding synchronization channel index.

In some examples of the method, apparatuses, or non-transitory computer-readable medium described herein, the pseudo-random function comprises a one-to-one mapping from the physical device ID and the synchronization channel index to the logical ID. Additionally or alternatively, some examples may include processes, features, means, or instructions for calculating, for each instance of the periodically repeating synchronization channel, a first SSS ID based at least in part on the logical ID and the corresponding synchronization channel index, and generating a first constant amplitude zero autocorrelation waveform sequence based at least in part on the first SSS ID. Additionally or alternatively, in some examples the first SSS is a first Zadoff-Chu sequence whose root index is the first SSS ID, and In some examples of the method, apparatuses, or non-transitory computer-readable medium described herein, the first SSS is a Zadoff-Chu sequence whose root index is the first SSS ID. Additionally or alternatively, some examples may include processes, features, means, or instructions for calculating, for each instance of the periodically repeating synchronization channel in the frame, a second SSS ID based at least in part on the logical ID and the corresponding synchronization channel index, and generating a second constant amplitude zero autocorrelation waveform sequence based at least in part on the second SSS ID.

In some examples of the method, apparatuses, or non-transitory computer-readable medium described herein, the second SSS is a second Zadoff-Chu sequence whose root index is the second SSS ID. Additionally or alternatively, in some examples the pseudo-random function comprises a one-to-one mapping from the physical device ID to the logical ID, for at least the synchronization channel index. Additionally or alternatively, in some examples each instance of the periodically repeating synchronization channel includes a primary synchronization signal (PSS), the first SSS, and a second SSS.

Some examples of the method, apparatuses, or non-transitory computer-readable medium described herein may further include processes, features, means, or instructions for calculating a first SSS ID ($SSS_{id1}(X, p)$) according to the formula $$SSS_{id1}(X, p) = \left\lfloor \frac{\left\lfloor \frac{N^2}{P} \right\rfloor p + f_p(x)}{N} \right\rfloor,$$

wherein X is the physical device ID, p is the synchronization channel index, P is a number of instances of the periodically repeating synchronization channel in the frame, N is a number of different possible sequences for $SSS_{id1}(X, p)$, and $f_p(X)$ is the logical ID associated with $SSS_{id1}(X, p)$; and, and generating the first SSS using the first SSS ID. Additionally or alternatively, some examples may include processes, features, means, or instructions for calculating a second SSS ID ($SSS_{id2}(X, p)$) according to the formula $$SSS_{id2}(X, p) = \mathrm{mod}\!\left(\left\lfloor \frac{N^2}{P} \right\rfloor p + f_p(X), N\right),$$

wherein X is the physical device ID, p is the synchronization channel index, P is a number of instances of the periodically repeating synchronization channel in the frame, N is a number of different possible sequences for $SSS_{id2}(X, p)$, and $f_p(X)$ is the logical ID associated with $SSS_{id2}(X, p)$; and generating the second SSS using the second SSS ID.

BRIEF DESCRIPTION OF THE DRAWINGS

Aspects of the disclosure are described in reference to the following figures.

DETAILED DESCRIPTION

Aspects of the disclosure are initially described in the context of a wireless communication system. Specific examples are then described for secondary synchronization signals for a synchronization channel in a cellular internet of things (CIoT) system. These and other aspects of the disclosure are further illustrated by and described with reference to apparatus diagrams, system diagrams, and flowcharts that relate to.

Figure 1:
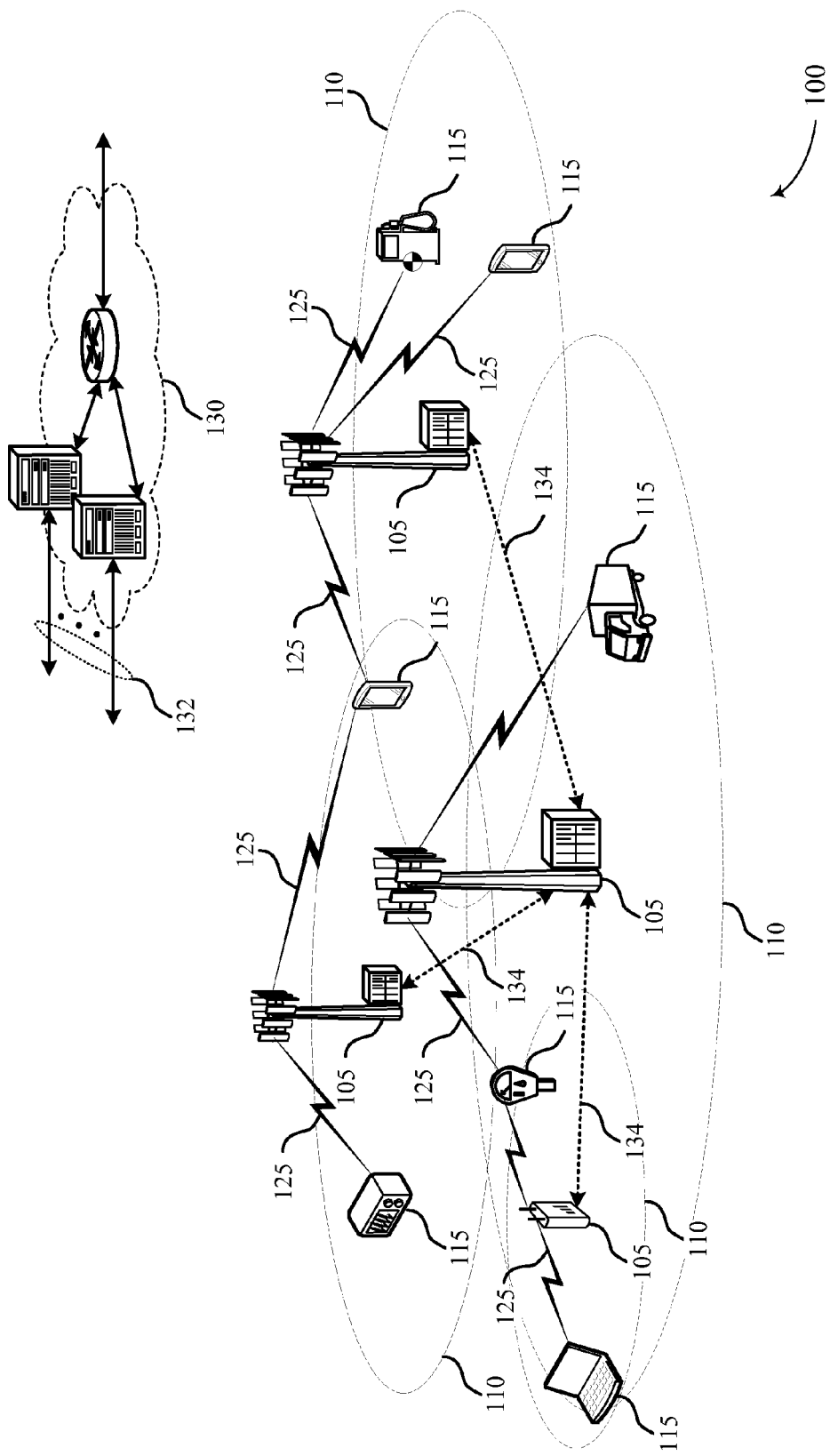
FIG. 1 illustrates an example of a wireless communications system that supports generating secondary synchronization signals for a synchronization channel in a CIoT system in accordance with various aspects of the present disclosure.

FIG. 1 illustrates an example of a wireless communications system 100 in accordance with various aspects of the present disclosure. The wireless communications system 100 includes base stations 105, user equipment (UEs) 115, and a core network 130. In some examples, the wireless communications system 100 may be a Long Term Evolution (LTE)/LTE-advanced (LTE-a) network.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may also be a cellular phone, a wireless modem, a handheld device, a personal computer, a tablet, a personal electronic device, a machine type communication (MTC) device or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

UEs 115 and base stations 105 may implement systems, methods, and apparatuses for providing a synchronization channel including secondary synchronization signals. The UE 115 and/or base station 105 may determining a logical identifier (ID) as a pseudo-random function of a physical device ID of the wireless device and a synchronization channel index to perform synchronization, which may be downlink or uplink synchronization. The synchronization channel index may correspond to an instance of a periodically repeating synchronization channel in a radio frame to be sent by the UE 115 or base station 105. The synchronization channel may be to synchronize a downlink to communicate with a UE operating in a narrow-band cellular internet of things. The wireless device may also be a user equipment or other wireless device operating in a cellular internet of things, such that the synchronization channel may be to synchronize an uplink to communicate with a base station. The UE 115 or base station 105 may generate a first secondary synchronization signal (SSS) for each instance of the periodically repeating synchronization channel in the frame based at least in part on the logical ID and the corresponding synchronization channel index, and transmit the frame from the UE 115 or base station 105 to a wireless device to perform synchronization. The first SSS may be generated by calculating a first SSS ID ($SSS_{id1}(X, p)$) using the synchronization channel index, number of instances of the periodically repeating synchronization channel in the frame, the number of different possible sequences for $SSS_{id1}(X, p)$, and the logical ID associated with $SSS_{id1}(X, p)$ The method may also include generating a second SSS for each instance of the periodically repeating synchronization channel based at least in part on the logical ID and the corresponding synchronization channel index. The second SSS may be generated by calculating a second SSS ID ($SSS_{id2}(X, p)$) using the synchronization channel index, number of instances of the periodically repeating synchronization channel in the frame, the number of different possible sequences for $SSS_{id2}(X, p)$, and the logical ID associated with $SSS_{id2}(X, p)$. In addition to the first SSS and second SSS, the synchronization channel may include one or more primary synchronization signals (PSSs).

Some types of wireless devices may provide for automated communication. Automated wireless devices may include those implementing Machine-to-Machine (M2M) communication or Machine Type Communication (MTC). M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be MTC devices, such as those designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices may also be configured to enter a power saving "deep sleep" mode when not engaging in active communications.

Figure 2:
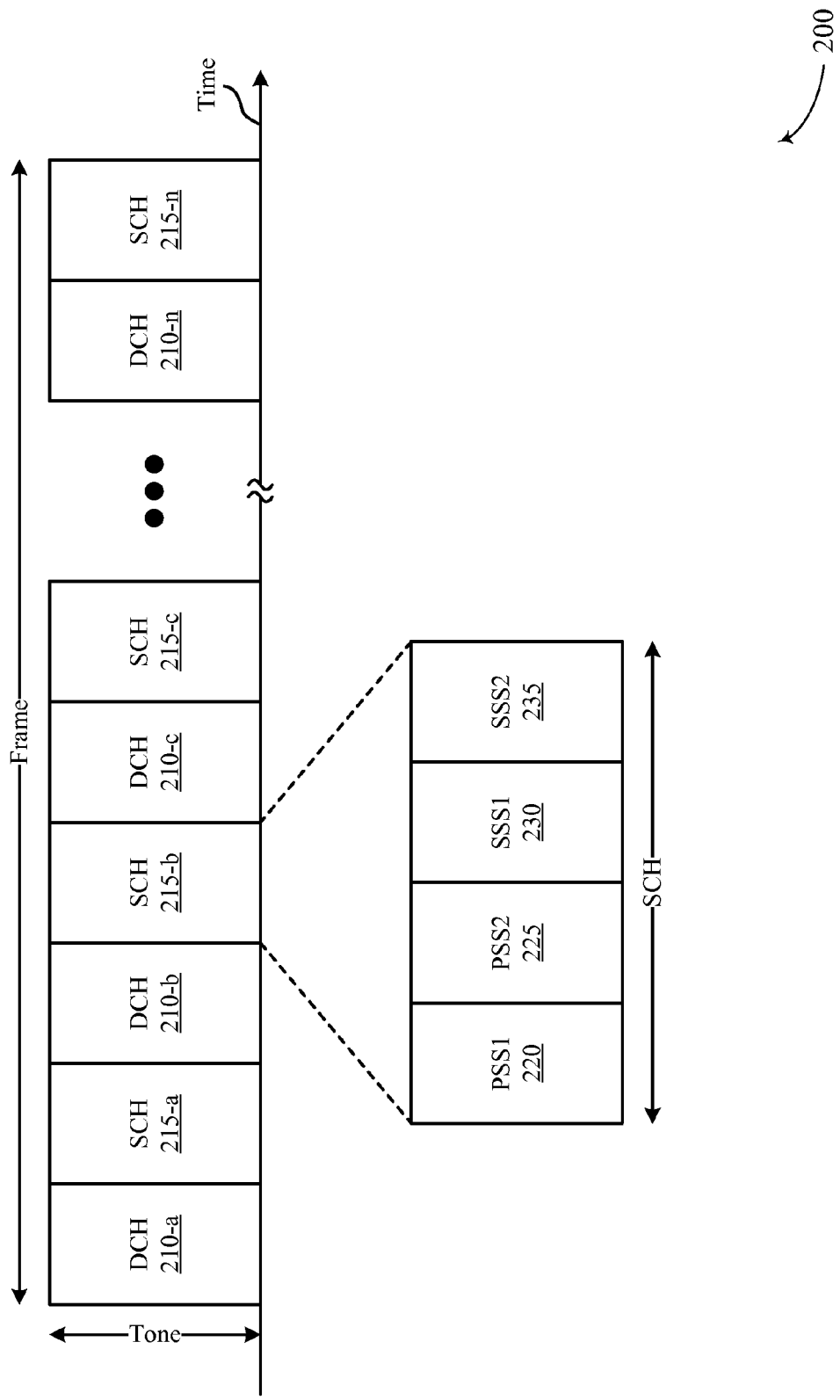
FIG. 2 illustrates an example of a wireless communications subsystem that supports generating secondary synchronization signals for a synchronization channel in a CIoT system in accordance with various aspects of the present disclosure.

FIG. 2 illustrates an example of a frame 200 for providing a synchronization channel including secondary synchronization signals in accordance with various aspects of the present disclosure. Frame 200 may be transmitted or received by a first wireless device to synchronize the first wireless device with a second wireless device. For example, frame 200 may be transmitted by a base station 105-a and received by a UE 115-a, which may be examples of a UE 115 base station 105 described with reference to FIG. 1.

Frame 200 that is transmitted may include a number of periodically repeating data channels (DCHs) that alternate with a number of periodically repeating synchronization channels (SCHs). In the time domain, frame 200 includes DCH 210-a, SCH 215-a, DCH 210-b, SCH 215-b, DCH 210-b, SCH 215-b, DCH 210-n, and SCH 215-n. Four DCHs and four SCHs are illustrates in frame 200, but a frame may include an arbitrary number of such channels. In one example, frame 200 has eight DCHs and eight SCHs that alternate within the frame. In other examples, an SCH may be positioned first in the frame prior to a DCH. In other examples, channels instead of or in addition to DCHs may be within the frame in addition to the SCHs.

Each SCH may contain a number of synchronization signals, including two primary synchronization signals (PSS), PSS1 220 and PSS2 225, and two secondary synchronization signals (SSS), SSS1 230 and SSS2 235. PSS1 220, PSS2 225, SSS1 230, and SSS2 235 are illustrated only for SCH 215-b, but each of SCH 215-a, SCH 215-b, and SCH 215-c, up to SCH 215-n may include two PSS and two SSS signals as well. These synchronization signals may be periodically transmitted in SCHs 215 to enable time, including sample-level and frame-level, and frequency synchronization, as well as identification of the transmitting wireless device or cell. Although PSS1 220, PSS2 225, SSS1 230, and SSS2 235 are illustrated as being in adjacent time slots, in other examples, one or more of PSS1 220, PSS2 225, SSS1 230, and SSS2 235 are spread among non-adjacent time and/or reordered in time.

PSS1 220 and PSS2 225 may be two repetitions of the same sequence. In an example, PSS1 220 is a pseudo-random sequence, and PSS2 225 is a copy of the same pseudo-random sequence. In some examples, PSS1 220 and PSS2 225 are used to synchronize subframe, slot, and symbol synchronization in the time domain, and identify the center of a channel bandwidth in the frequency domain.

SSS1 230 and SSS2 235 may be two difference sequences used to encode various bits of information used for synchronization. In an example, SSS1 230 and SSS2 235 encode bits indicating a logical ID associated with the physical device ID for the transmitting wireless device to which the receiving wireless device will be synchronized, and bits indicating an index for the particular SCH that includes SSS1 230 and SSS2 235. The logical ID may be used to identify the transmitting wireless device or cell, for example a base station. The synchronization channel index, p, identifies the SCH within a frame, which may be used for frame-level synchronization. In some examples, SSS1 230 and SSS2 235 are sequences of the same length; in other examples, they are of different lengths. Where SSS1 230 may be one of N possible sequences, and SSS2 235 may be one of N possible sequences. SSS1 230 together with SSS2 235 may therefore be up to N*N different combinations of sequences, conveying up to $\log_2(N*N)$ bits of information. Here, such bits of information include the aforementioned bits indicating a logical ID and bits indicating an SCH index for the particular SCH.

In an example, SSS1 230 and SSS2 235 are each a constant amplitude zero autocorrelation waveform sequences, and in particular a Zadoff-Chu sequence. A Zadoff-Chu sequence may have length L and a root index m, where m is a whole number in the range from 1 through L−1. That is, m=1, . . . , L−1. In such case, N=L−1. Here, each of SSS1 230 and SSS2 235 may be generated based on a Zadoff-Chu sequence where L=71. Thus, N*N=4,900, and SSS1 230 and SSS2 235 may convey up to twelve (12) bits of information.

As discussed above, SSS1 230 and SSS2 235 may encode a logical ID. Here, the logical ID is derived from the physical device ID for a transmitting wireless device as a time-varying, pseudo-random function of the physical device ID. The logical ID may then be used to generate both SSS1 230 and SSS2 235. Specifically, the logical ID may be used to calculate $SSS_{id1}$ and $SSS_{id2}$, which may be used as the root index m to generate these sequences SSS1 230 and SSS2 235, respectively, where SSS1 230 and SSS2 235 are Zadoff-Chu sequences.

The use of a logical ID generated as a time-varying, pseudo-random function of the physical device ID and the synchronization channel index may help reduce persistent false detections. A wireless device attempting to detect a synchronization channel may receive overlapping synchronization channel transmissions from neighboring wireless devices. For example, the wireless device may be in a geographic location where the coverage area for a first base station overlaps with the geographic coverage area for a second base station. If the wireless device receives overlapping synchronization channel transmissions, it may detect a first SSS (SSS1) transmitted from the first base station and a second SSS (SSS2) transmitted from the second base station for a subframe at a first time. This combination of SSS1 and SSS2 may indicate an ineligible combination and result in a misdetection of a transmitting base station. Where the physical device ID is used to generate SSS1 and SSS2, the subsequently detected SSS1 from the first base station and SSS2 from the second base station, for a second subframe at a second time, may likewise indicate the same ineligible combination resulting in a misdetection, thus resulting in a persistent misdetection. By using the logical ID, the receiving wireless device may more quickly determine that there is a misdetection occurring because there may be no relation between detection of SSS1 and SSS2 in the first subframe and the detection in the second subframe. Reducing persistent misdetections may result in improved synchronization performance for the wireless device.

A following example illustrates how the logical ID associated with SSS1 230, $SSS_{id1}$ and the logical ID associated with SSS2 235, $SSS_{id2}$, may be determined. A number of physical device IDs, X may be determined based on the number of different sequences for SSS1, given by N, and for SSS2, also given by N, as well as the number of instances of the synchronization channel within a frame, represented by P. Thus, the value of X may be Let p $$0, 1, ..., \left\lfloor \frac{N^2}{P} \right\rfloor - 1.$$

represent the synchronization channel index. Thus, the synchronization channel index may be 0, 1, P−1.

We then select a pseudo-random permutation function, $f_p(X)$, for each value of the synchronization index p, such that three conditions are met. The first condition is that the function is a one-to-one mapping, i.e. the set size does not change:

$$f_p(X): \left\{ 0, 1, ..., \left\lfloor \frac{N^2}{P} \right\rfloor - 1 \right\} \rightarrow \left\{ 0, 1, ..., \left\lfloor \frac{N^2}{P} \right\rfloor - 1 \right\} \quad (1)$$

The second condition is that, for a given synchronization channel index, p, the output of the function is different for each physical device ID, X:

$$f_p(X) \neq f_p(X'), \text{ if } X \neq X' \quad (2)$$

The third condition is that, for a given input physical device ID, X, the output of the function is different for each synchronization channel index, p:

$$f_p(X) \neq f_{p'}(X), \text{ if } p \neq p' \quad (3)$$

The logical ID may then be used to generate $SSS_{id1}$ associated with SSS1 230, and $SSS_{id2}$ associated with SSS2 235 according to the following equations:

$$SSS_{id1}(X, p) = \left\lfloor \frac{\left\lfloor \frac{N^2}{P} \right\rfloor p + f_p(X)}{N} \right\rfloor \quad (4)$$

$$SSS_{id2}(X, p) = \mod\left( \left\lfloor \frac{N^2}{P} \right\rfloor p + f_p(X), N \right) \quad (5)$$

where X is the physical device ID, p is the synchronization channel index, P is the number of instances of the periodically repeating synchronization channel in the frame, N is a number of different possible sequences for $SSS_{id1}(X, p)$ and $SSS_{id2}(X, p)$, and $f_p(X)$ is the logical ID associated with $SSS_{id2}(X, p)$. It should be noted that equation 4 includes two nested floor functions, and equation 5 contains a single floor function within a modulo N operation. In effect, $SSS_{id2}(X, p)$ is the remainder of the operation used to determine the value $SSS_{id1}(X, p)$.

Figure 3:
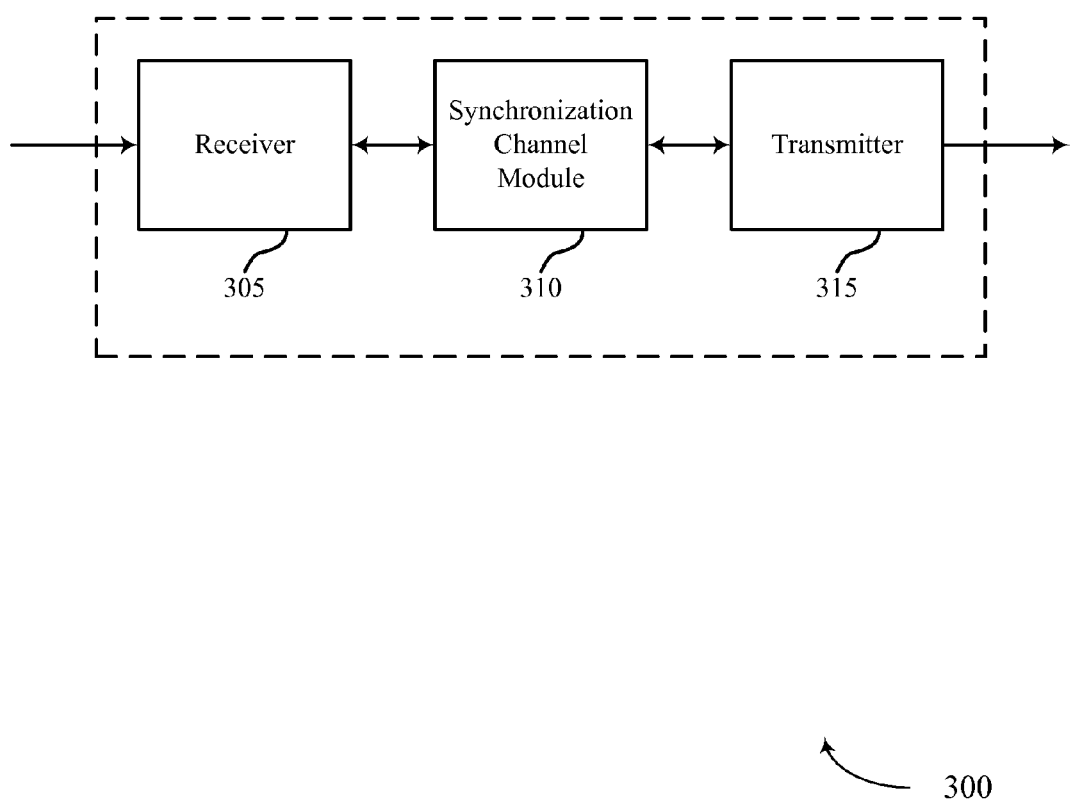
FIGS. 3-5 show block diagrams of a wireless device that supports generating secondary synchronization signals for a synchronization channel in a CIoT system in accordance with various aspects of the present disclosure.

FIG. 3 shows a block diagram of a wireless device 300 configured for generating secondary synchronization signals for a synchronization channel in a CIoT system in accordance with various aspects of the present disclosure. Wireless device 300 may be an example of aspects of a UE 115 described with reference to FIGS. 1-2. Wireless device 300 may include a receiver 305, a synchronization channel module 310, or a transmitter 315. Wireless device 300 may also include a processor. Each of these components may be in communication with each other.

The receiver 305 may receive information such as packets, user data, or control information associated with various information channels (e.g., control channels, data channels, and information related to generating secondary synchronization signals for a synchronization channel in a CIoT system, etc.). Information may be passed on to the synchronization channel module 310, and to other components of wireless device 300.

The synchronization channel module 310 may determine, at a wireless device, a logical ID as a pseudo-random function of a physical device ID of the wireless device and a synchronization channel index, wherein the synchronization channel index corresponds to an instance of a periodically repeating synchronization channel in a frame, generate a first SSS for each instance of the periodically repeating synchronization channel in the frame based at least in part on the logical ID and the corresponding synchronization channel index, and transmit the frame from the wireless device.

The transmitter 315 may transmit signals received from other components of wireless device 300. In some examples, the transmitter 315 may be collocated with the receiver 305 in a transceiver module. The transmitter 315 may include a single antenna, or it may include a plurality of antennas.

Figure 4:
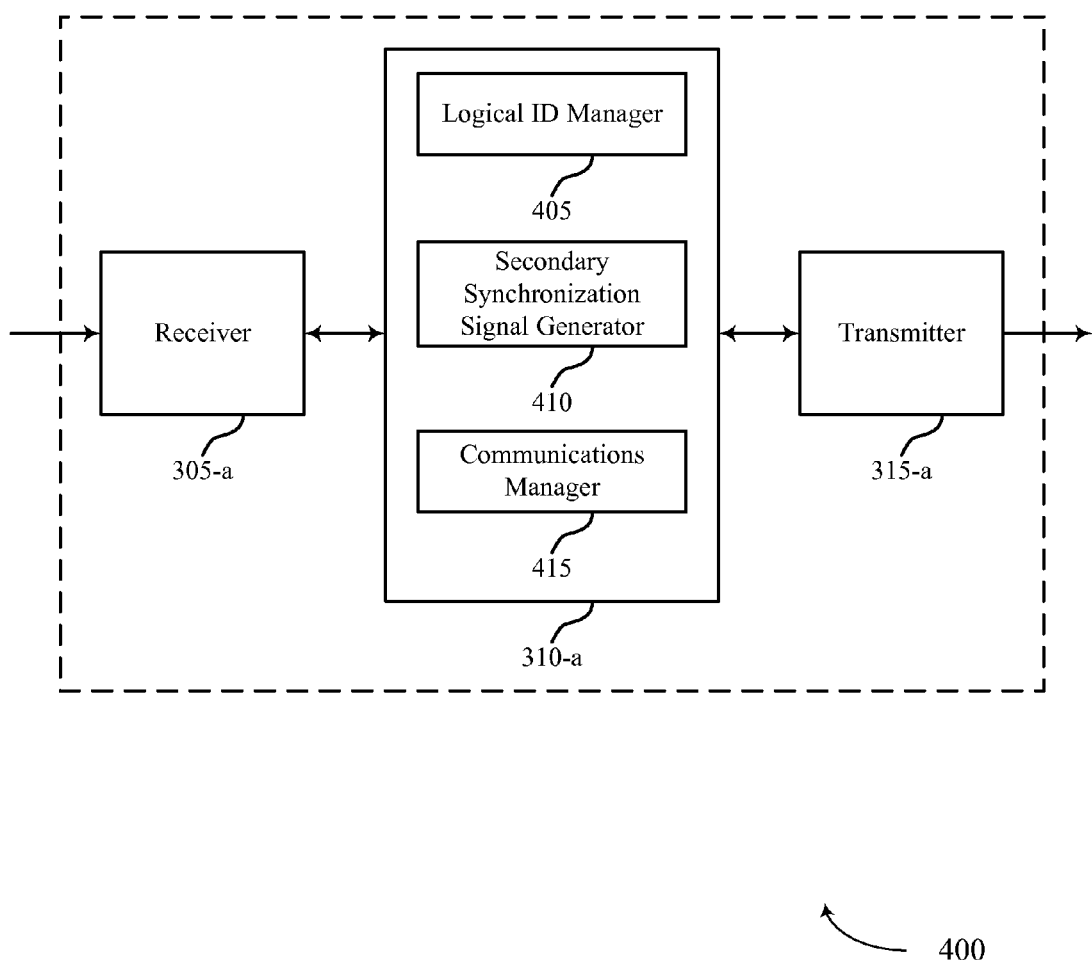

FIG. 4 shows a block diagram of a wireless device 400 for generating secondary synchronization signals for a synchronization channel in a CIoT system in accordance with various aspects of the present disclosure. Wireless device 400 may be an example of aspects of a wireless device 300 or a UE 115 described with reference to FIGS. 1-3. Wireless device 400 may include a receiver 305-*a*, a synchronization channel module 310-*a*, or a transmitter 315-*a*. Wireless device 400 may also include a processor. Each of these components may be in communication with each other. The synchronization channel module 310-*a* may also include a logical ID manager 405, a secondary synchronization signal generator 410, and a communications manager 415.

The receiver 305-*a* may receive information which may be passed on to synchronization channel module 310-*a*, and to other components of wireless device 400. The synchronization channel module 310-*a* may perform the operations described with reference to FIG. 3. The transmitter 315-*a* may transmit signals received from other components of wireless device 400.

The logical ID manager 405 may determine, at a wireless device, a logical ID as a pseudo-random function of a physical device ID of the wireless device and a synchronization channel index, wherein the synchronization channel index corresponds to an instance of a periodically repeating synchronization channel in a frame as described with reference to FIG. 2. In some examples, the pseudo-random function comprises a one-to-one mapping from the physical device ID and the synchronization channel index to the logical ID. In some examples, each instance of the periodically repeating synchronization channel includes one or more PSSs, a first SSS, and a second SSS.

The secondary synchronization signal generator 410 may generate a first SSS for each instance of the periodically repeating synchronization channel in the frame based at least in part on the logical ID and the corresponding synchronization channel index as described with reference to FIG. 2. The secondary synchronization signal generator 410 may also generate a second SSS for each instance of the periodically repeating synchronization channel in the frame based at least in part on the logical ID and the corresponding synchronization channel index.

The communications manager 415 may transmit the frame from the wireless device as described with reference to FIG. 2.

Figure 5:
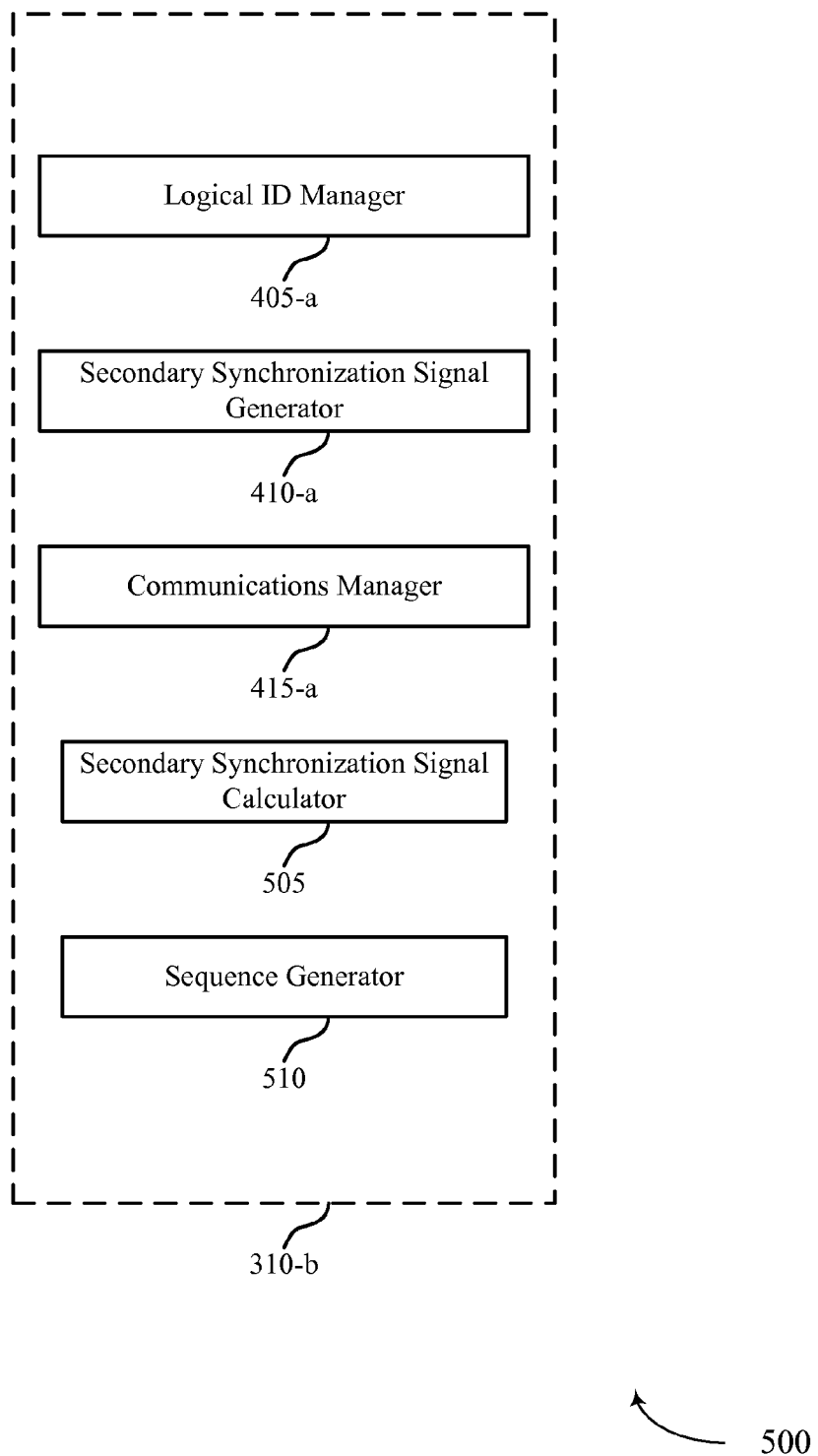

FIG. 5 shows a block diagram 500 of a synchronization channel module 310-*b* which may be a component of a wireless device 300 or a wireless device 400 for generating secondary synchronization signals for a synchronization channel in a cellular internet of things (CIoT) system in accordance with various aspects of the present disclosure. The synchronization channel module 310-*b* may be an example of aspects of a synchronization channel module 310 described with reference to FIGS. 3-4. The synchronization channel module 310-*b* may include a logical ID manager 405-*a*, a secondary synchronization signal generator 410-*a*, and a communications manager 415-*a*. Each of these modules may perform the functions described with reference to FIG. 4. The synchronization channel module 310-*b* may also include a secondary synchronization signal calculator 505 and a sequence generator 510.

The secondary synchronization signal calculator 505 may calculate, for each instance of the periodically repeating synchronization channel, a first SSS ID based at least in part on the logical ID and the corresponding synchronization channel index as described with reference to FIG. 2. The secondary synchronization signal calculator 505 may also calculate, for each instance of the periodically repeating synchronization channel in the frame, a second SSS ID based at least in part on the logical ID and the corresponding synchronization channel index. The secondary synchronization signal calculator 505 may also calculate a first SSS ID ($SSS_{id1}$) according to the formula described above with reference to equation 4. The secondary synchronization signal calculator 505 may also calculate a second SSS ID ($SSS_{id2}$) according to the formula described above with reference to equation 4.

The sequence generator 510 may generate a first constant amplitude zero autocorrelation waveform sequence based at least in part on the first SSS ID as described with reference to FIG. 2. In some examples, the first SSS may be a Zadoff-Chu sequence whose root index may be the first SSS ID ($SSS_{id1}$). The sequence generator 510 may generate a second constant amplitude zero autocorrelation waveform sequence based at least in part on the second SSS ID ($SSS_{id2}$). In some examples, the second SSS may also be a second Zadoff-Chu sequence whose root index may be the second SSS ID.

Figure 6:
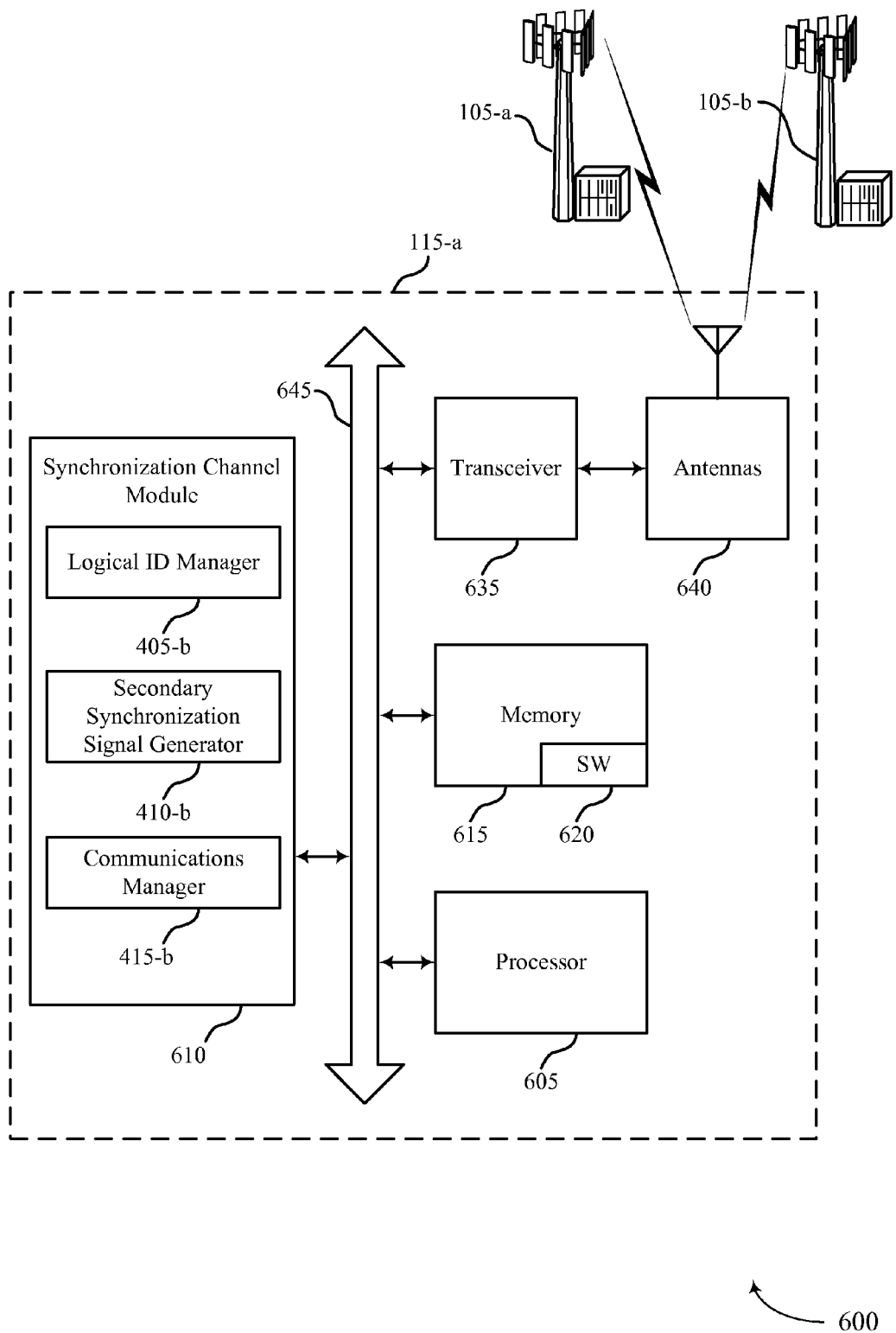
FIG. 6 illustrates a block diagram of a system including a user equipment (UE) that supports generating secondary synchronization signals for a synchronization channel in a CIoT system in accordance with various aspects of the present disclosure.

FIG. 6 shows a diagram of a system 600 including a UE 115 configured for in accordance with various aspects of the present disclosure. System 600 may include UE 115-*a*, which may be an example of a wireless device 300, a wireless device 400, or a UE 115 described with reference to FIGS. 1, 2 and 3-5. UE 115-*a* may include a synchronization channel module 610, which may be an example of a synchronization channel module 310 described with reference to FIGS. 3-5. UE 115-*a* may also include a logical ID manager 405-*a*, a secondary synchronization signal generator 410-*a*, and a communications manager 415-*a*. UE 115-*a* may also include components for bi-directional voice and data communications including components for transmitting communications and components for receiving communications. For example, UE 115-*a* may communicate bi-directionally with one or more of base station 105-*a* and base station 105-*b*, for example to receive multiple overlapping synchronization channels.

UE 115-*a* may also include a processor 605, and memory 615 (including software (SW)) 620, a transceiver 635, and one or more antenna(s) 640, each of which may communicate, directly or indirectly, with one another (e.g., via buses 645). The transceiver 635 may communicate bi-directionally, via the antenna(s) 640 or wired or wireless links, with one or more networks, as described above. For example, the transceiver 635 may communicate bi-directionally with a base station 105 or another UE 115. The transceiver 635 may include a modem to modulate the packets and provide the modulated packets to the antenna(s) 640 for transmission, and to demodulate packets received from the antenna(s) 640. While UE 115-*a* may include a single antenna 640, UE 115-*a* may also have multiple antennas 640 capable of concurrently transmitting or receiving multiple wireless transmissions.

The memory 615 may include random access memory (RAM) and read only memory (ROM). The memory 615 may store computer-readable, computer-executable software/firmware code 620 including instructions that, when executed, cause the processor 605 to perform various functions described herein (e.g., generating secondary synchronization signals for a synchronization channel in a CIoT system, etc.). Alternatively, the software/firmware code 620 may not be directly executable by the processor 605 but cause a computer (e.g., when compiled and executed) to perform functions described herein. The processor 605 may include an intelligent hardware device (e.g., a central processing unit (CPU), a microcontroller, an application specific integrated circuit (ASIC), etc.).

Figure 7:
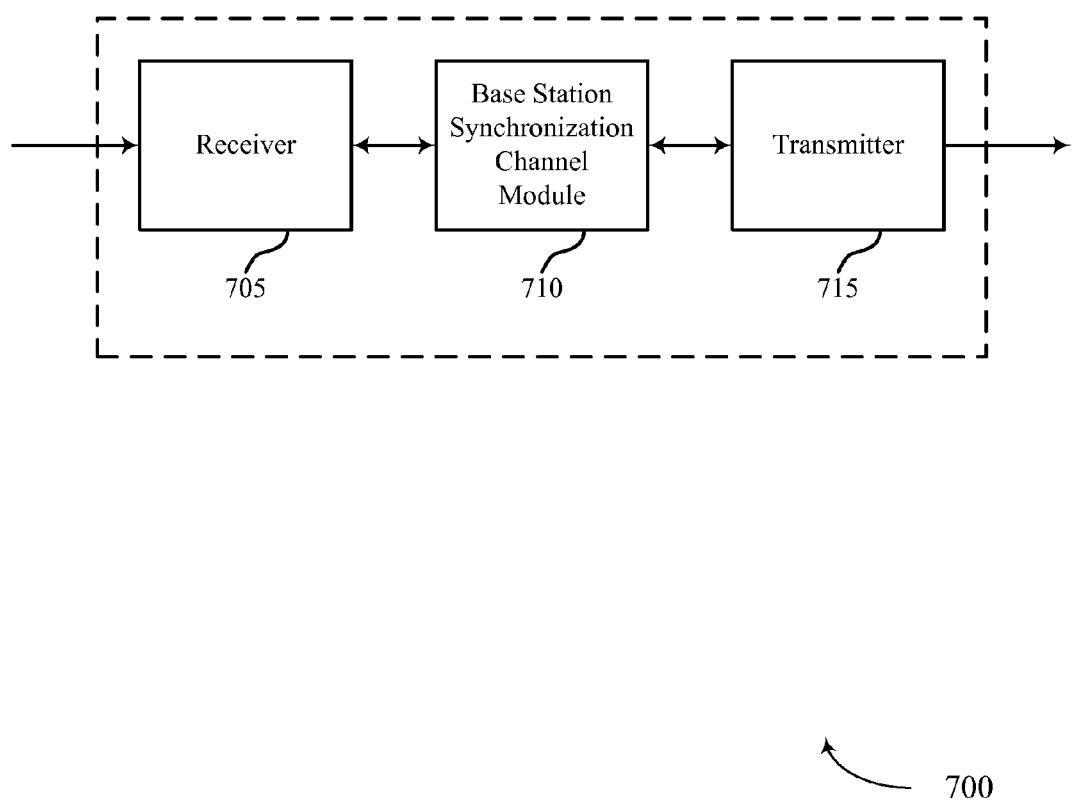
FIGS. 7-9 show block diagrams of a wireless device that supports generating secondary synchronization signals for a synchronization channel in a CIoT system in accordance with various aspects of the present disclosure.

FIG. 7 shows a block diagram of a wireless device 700 configured for generating secondary synchronization signals for a synchronization channel in a CIoT system in accordance with various aspects of the present disclosure. Wireless device 700 may be an example of aspects of a base station 105 described with reference to FIGS. 1-6. Wireless device 700 may include a receiver 705, a base station synchronization channel module 710, or a transmitter 715. Wireless device 700 may also include a processor. Each of these components may be in communication with each other.

The receiver 705 may receive information such as packets, user data, or control information associated with various information channels (e.g., control channels, data channels, and information related to generating secondary synchronization signals for a synchronization channel in a CIoT system, etc.). Information may be passed on to the base station synchronization channel module 710, and to other components of wireless device 700.

The base station synchronization channel module 710 may determine, at a base station, a logical ID as a pseudo-random function of a physical device ID of the base station and a synchronization channel index, wherein the synchronization channel index corresponds to an instance of a periodically repeating synchronization channel in a frame, generate a first SSS for each instance of the periodically repeating synchronization channel in the frame based at least in part on the logical ID and the corresponding synchronization channel index, and transmit the frame from the base station. Such transmission may be to a UE 115 or another machine or device communicating in the CIoT system.

The transmitter 715 may transmit signals received from other components of wireless device 700. In some examples, the transmitter 715 may be collocated with the receiver 705 in a transceiver module. The transmitter 715 may include a single antenna, or it may include a plurality of antennas.

Figure 8:
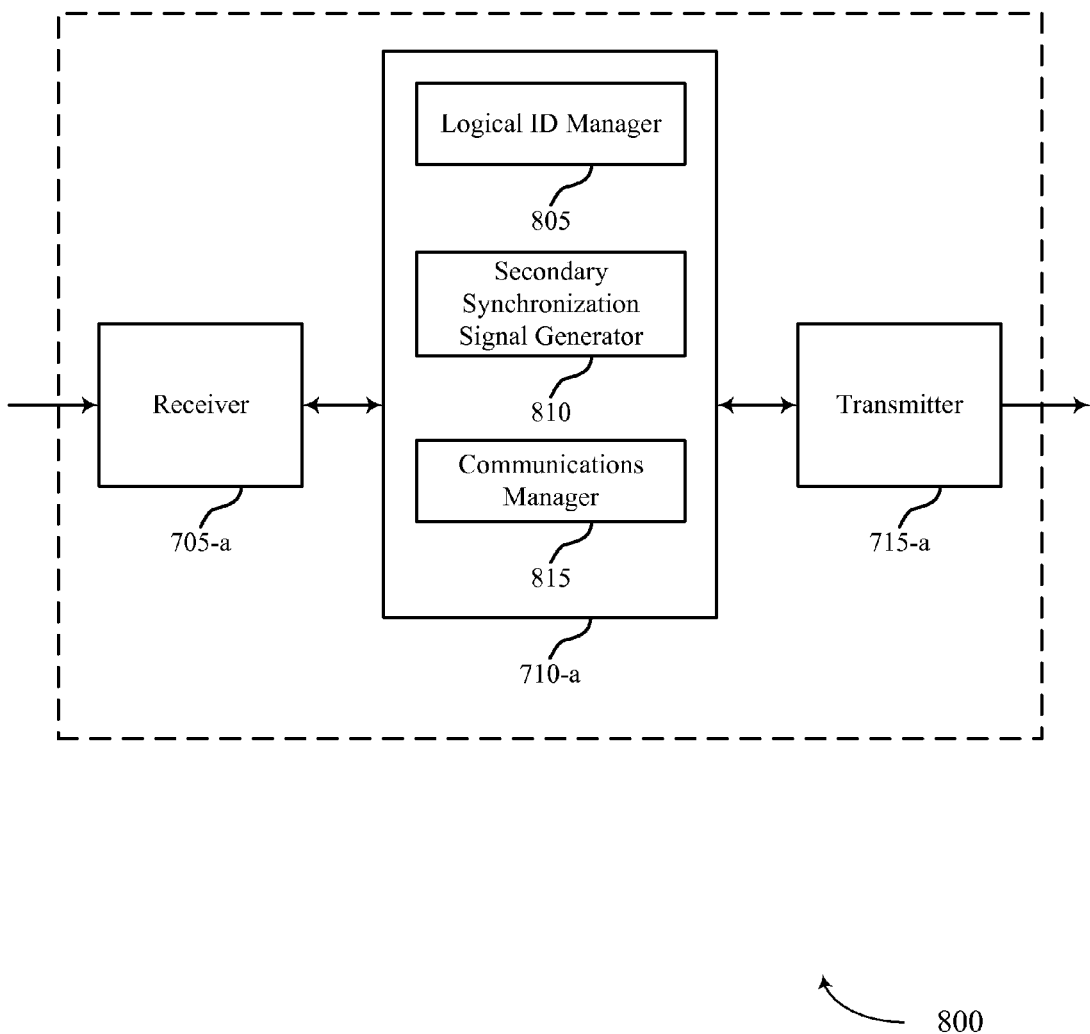

FIG. 8 shows a block diagram of a wireless device 800 for generating secondary synchronization signals for a synchronization channel in a CIoT system in accordance with various aspects of the present disclosure. Wireless device 800 may be an example of aspects of a wireless device 700 or a base station 105 described with reference to FIGS. 1-7. Wireless device 800 may include a receiver 705-*a*, a base station synchronization channel module 710-*a*, or a transmitter 715-*a*. Wireless device 800 may also include a processor. Each of these components may be in communication with each other. The base station synchronization channel module 710-*a* may also include a logical ID manager 805, a secondary synchronization signal generator 810, and a communications manager 815.

The logical ID manager 805 may determine, at a base station, a logical ID as a pseudo-random function of a physical device ID of the base and a synchronization channel index, wherein the synchronization channel index corresponds to an instance of a periodically repeating synchronization channel in a frame as described with reference to FIG. 2. In some examples, the pseudo-random function comprises a one-to-one mapping from the physical device ID and the synchronization channel index to the logical ID. In some examples, each instance of the periodically repeating synchronization channel includes one or more PSSs, a first SSS, and a second SSS. Logical ID manager 805 may also implement the features of the logical ID manager 405 described above with reference to FIGS. 4-6 in wireless device 800.

The secondary synchronization signal generator 810 may generate a first SSS for each instance of the periodically repeating synchronization channel in the frame based at least in part on the logical ID and the corresponding synchronization channel index as described with reference to FIG. 2. The secondary synchronization signal generator 810 may also generate a second SSS for each instance of the periodically repeating synchronization channel in the frame based at least in part on the logical ID and the corresponding synchronization channel index. Secondary synchronization signal generator 810 may also implement the features of the secondary synchronization signal generator 410 described above with reference to FIGS. 4-6 in wireless device 800.

The communications manager 815 may transmit the frame from the base station as described with reference to FIG. 2. Communications manager 815 may also implement the features of the communications manager 415 described above with reference to FIGS. 4-6 in wireless device 800.

The receiver 705-a may receive information which may be passed on to base station synchronization channel module 710-a, and to other components of wireless device 800. The base station synchronization channel module 710-a may perform the operations described with reference to FIG. 7. The transmitter 715-a may transmit signals received from other components of wireless device 800.

Figure 9:
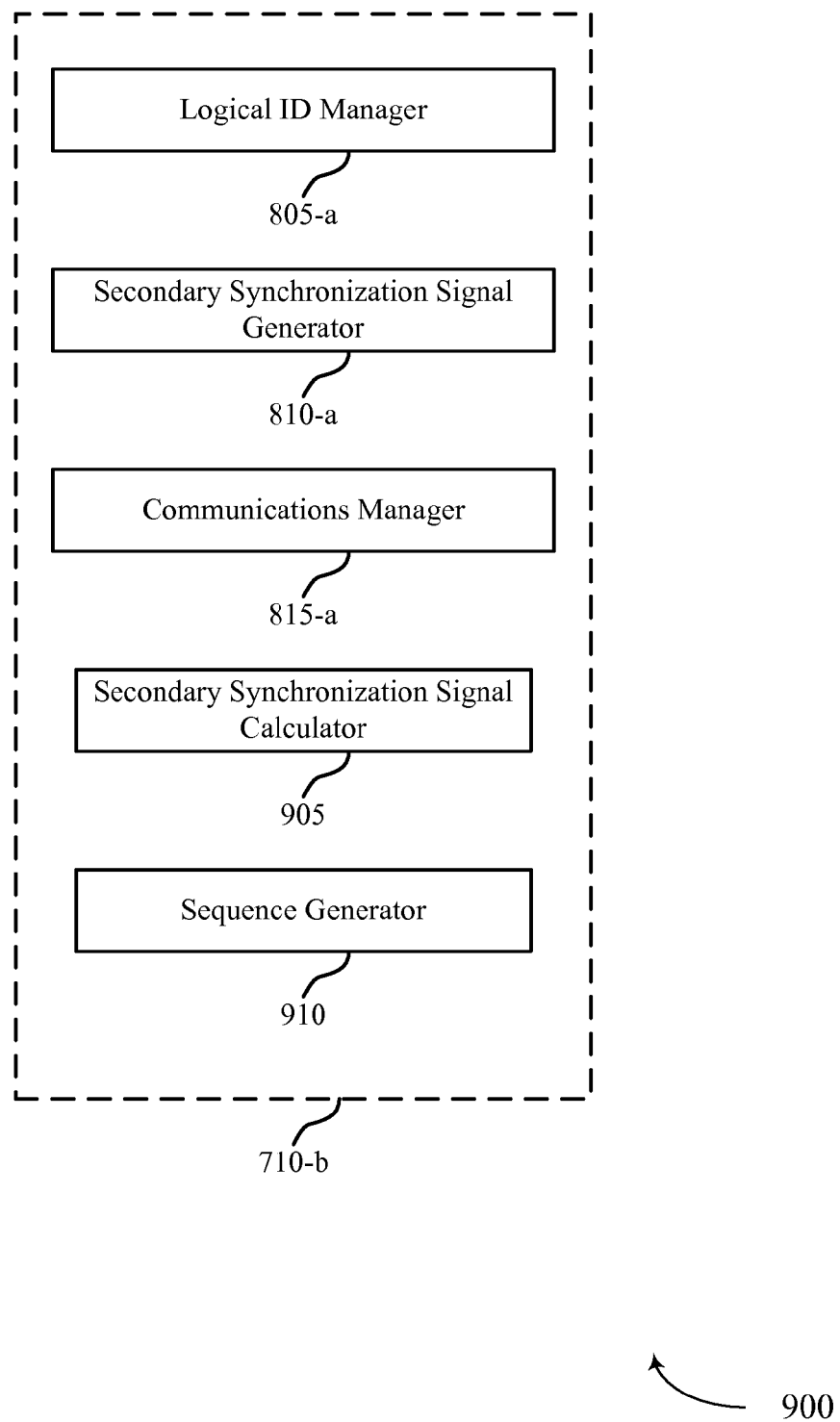

FIG. 9 shows a block diagram of a wireless device 900 including a base station synchronization channel module 710-b which may be a component of a wireless device 700 or a wireless device 800 for generating secondary synchronization signals for a synchronization channel in a CIoT system in accordance with various aspects of the present disclosure. The base station synchronization channel module 710-b may be an example of aspects of a base station synchronization channel module 710 described with reference to FIGS. 7-8. The base station synchronization channel module 710-b may include and a logical ID manager 805-a, a secondary synchronization signal generator 810-a, and a communications manager 815-a. Each of these modules may perform the functions described with reference to FIG. 8. The base station synchronization channel module 710-b may also include and a secondary synchronization signal calculator 905 and a sequence generator 910.

The secondary synchronization signal calculator 905 may calculate, for each instance of the periodically repeating synchronization channel, a first SSS ID based at least in part on the logical ID and the corresponding synchronization channel index as described with reference to FIG. 2. The secondary synchronization signal calculator 905 may also calculate, for each instance of the periodically repeating synchronization channel in the frame, a second SSS ID based at least in part on the logical ID and the corresponding synchronization channel index. The secondary synchronization signal calculator 905 may also calculate a first SSS ID ($SSS_{id1}$) according to the formula described above with reference to equation 4. The secondary synchronization signal calculator 905 may also calculate a second SSS ID ($SSS_{id2}$) according to the formula described above with reference to equation 4.

The sequence generator 910 may generate a first constant amplitude zero autocorrelation waveform sequence based at least in part on the first SSS ID as described with reference to FIG. 2. In some examples, the first SSS may be a Zadoff-Chu sequence whose root index may be the first SSS ID ($SSS_{id1}$). The sequence generator 910 may generate a second constant amplitude zero autocorrelation waveform sequence based at least in part on the second SSS ID ($SSS_{id2}$). In some examples, the second SSS may also be a second Zadoff-Chu sequence whose root index may be the second SSS ID.

Figure 10:
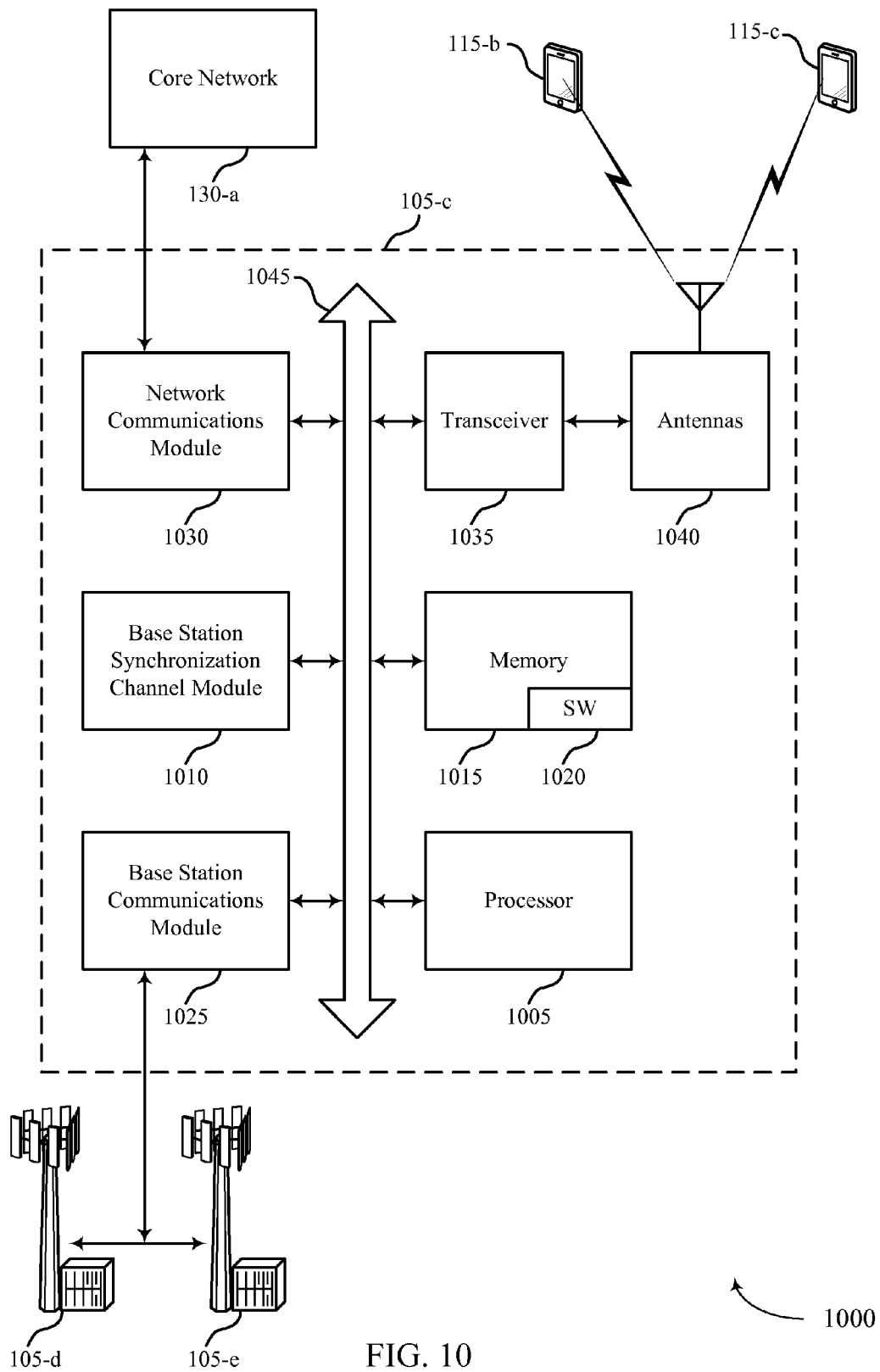
FIG. 10 illustrates a block diagram of a system including a base station that supports generating secondary synchronization signals for a synchronization channel in a CIoT system in accordance with various aspects of the present disclosure.

FIG. 10 shows a diagram of a system 1000 including a base station 105 configured for generating secondary synchronization signals for a synchronization channel in a CIoT system in accordance with various aspects of the present disclosure. System 1000 may include base station 105-c, which may be an example of a wireless device 700, a wireless device 800, or a base station 105 described with reference to FIGS. 1, 2 and 7-9. Base station 105-c may include a base station synchronization channel module, which may be an example of a base station synchronization channel module 710 described with reference to FIGS. 7-9. Base station 105-c may also include components for bi-directional voice and data communications including components for transmitting communications and components for receiving communications. For example, base station 105-c may communicate bi-directionally with UE 115-b and/or UE 115-c, for example to transmit a radio frame including periodic synchronization channels having a first PSS, a second PSS, a first SSS, and a second SSS.

In some cases, base station 105-c may have one or more wired backhaul links. Base station 105-c may have a wired backhaul link (e.g., S1 interface, etc.) to the core network 130. Base station 105-c may also communicate with other base stations 105, such as base station 105-d and base station 105-e via inter-base station backhaul links (e.g., an X2 interface). Each of the base stations 105 may communicate with UEs 115 using the same or different wireless communications technologies. In some cases, base station 105-c may communicate with other base stations such as 105-d or 105-e utilizing base station communications module 1025. In some examples, base station communications module 1025 may provide an X2 interface within a Long Term Evolution (LTE)/LTE-A wireless communication network technology to provide communication between some of the base stations 105. In some examples, base station 105-c may communicate with other base stations through core network 130. In some cases, base station 105-c may communicate with the core network 130 through network communications module 1030.

The base station 105-c may include a processor 1005, memory 1015 (including software (SW)1020), transceiver 1035, and antenna(s) 1040, which each may be in communication, directly or indirectly, with one another (e.g., over bus system 1045). The transceivers 1035 may be configured to communicate bi-directionally, via the antenna(s) 1040, with the UEs 115, which may be multi-mode devices. The transceiver 1035 (or other components of the base station 105-c) may also be configured to communicate bi-directionally, via the antennas 1040, with one or more other base stations (not shown). The transceiver 1035 may include a modem configured to modulate the packets and provide the modulated packets to the antennas 1040 for transmission, and to demodulate packets received from the antennas 1040. The base station 105-c may include multiple transceivers 1035, each with one or more associated antennas 1040. The transceiver may be an example of a combined receiver 705 and transmitter 715 of FIG. 7.

The memory 1015 may include RAM and ROM. The memory 1015 may also store computer-readable, computer-executable software code 1020 containing instructions that are configured to, when executed, cause the processor 1010 to perform various functions described herein (e.g., for generating secondary synchronization signals for a synchronization channel in a CIoT system, selecting coverage enhancement techniques, call processing, database management, message routing, etc.). Alternatively, the software 1020 may not be directly executable by the processor 1005 but be configured to cause the computer, e.g., when compiled and executed, to perform functions described herein. The processor 1005 may include an intelligent hardware device, e.g., a CPU, a microcontroller, an ASIC, etc. The processor 1005 may include various special purpose processors such as encoders, queue processing modules, base band processors, radio head controllers, digital signal processor (DSPs), and the like.

The base station communications module 1025 may manage communications with other base stations 105. In some cases, a communications management module may include a controller or scheduler for controlling communications with UEs 115 in cooperation with other base stations 105. For example, the base station communications module 1025 may coordinate scheduling for transmissions to UEs 115 for various interference mitigation techniques such as beamforming or joint transmission.

The components of wireless device 700, wireless device 800, wireless device 900, and base station synchronization channel module 710 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 11:
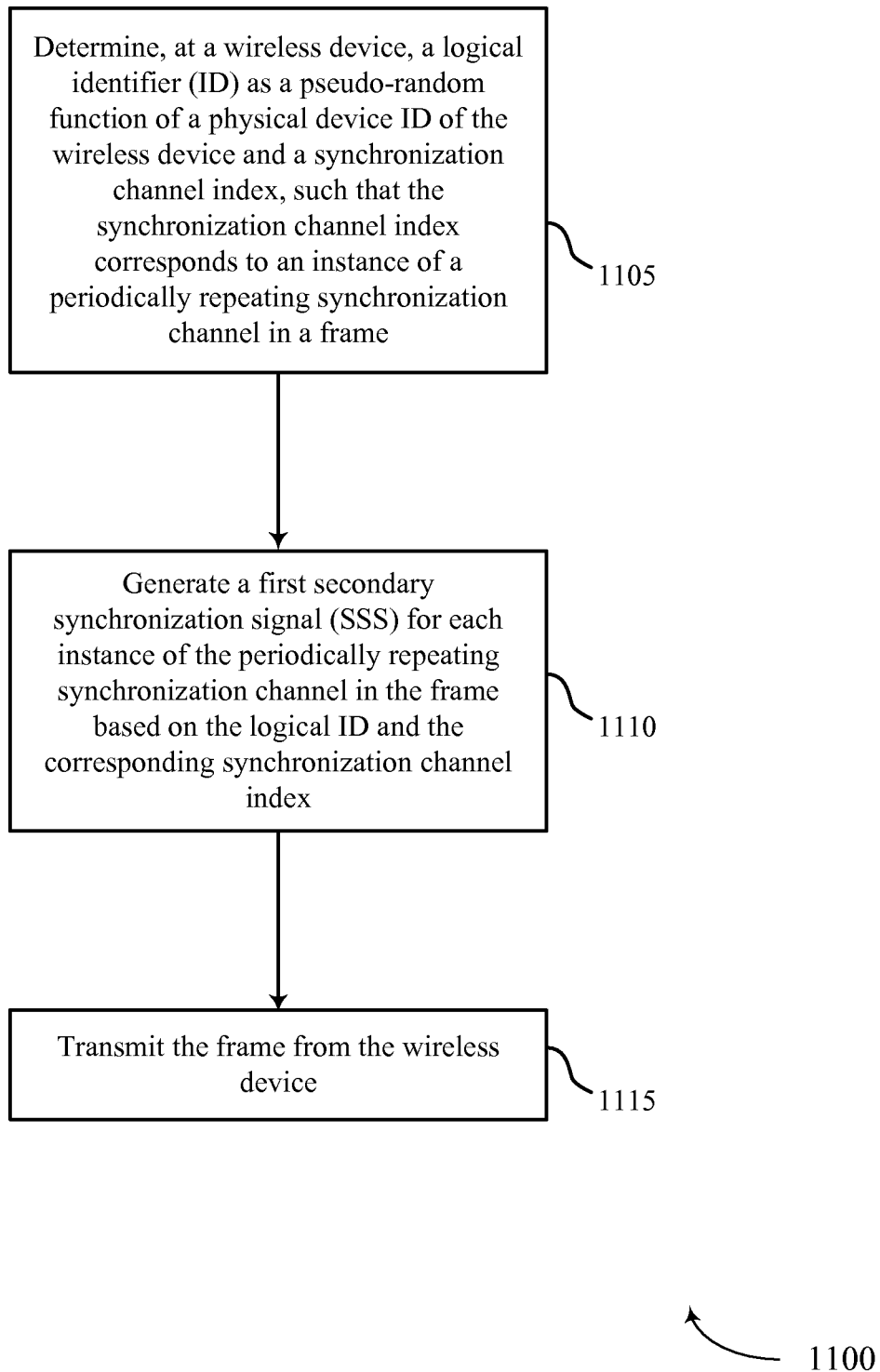
FIGS. 11-13 illustrate methods for generating secondary synchronization signals for a synchronization channel in a CIoT system in accordance with various aspects of the present disclosure.

FIG. 11 shows a flowchart illustrating a method 1100 for generating secondary synchronization signals for a synchronization channel in a CIoT system in accordance with various aspects of the present disclosure. The operations of method 1100 may be implemented by a UE 115 or its components or a base station 105 or its components as described with reference to FIGS. 1-10. For example, the operations of method 1100 may be performed by the synchronization channel module 310 as described with reference to FIGS. 3-6 or the base station synchronization channel module 710 as described with reference to FIGS. 7-10. In some examples, a UE 115 or base station 105 may execute a set of codes to control the functional elements of the UE 115 or base station 105 to perform the functions described below. Additionally or alternatively, the UE 115 or base station 105 may perform aspects the functions described below using special-purpose hardware.

At block 1105, the UE 115 or base station 105 may determine a logical identifier (ID) as a pseudo-random function of a physical device ID and a synchronization channel index, wherein the synchronization channel index corresponds to an instance of a periodically repeating synchronization channel in a frame as described with reference to FIG. 2. In certain examples, the operations of block 1105 may be performed by the logical ID manager 405 as described with reference to FIGS. 4-6 or the logical ID manager 805 as described with reference to FIGS. 8-9.

At block 1110, the UE 115 or base station 105 may generate a first secondary synchronization signal (SSS) for each instance of the periodically repeating synchronization channel in the frame based at least in part on the logical ID and the corresponding synchronization channel index as described with reference to FIG. 2. In certain examples, the operations of block 1110 may be performed by the secondary synchronization signal generator 410 as described with reference to FIGS. 4-6 or the secondary synchronization signal generator 810 as described with reference to FIGS. 8-9.

At block 1115, the UE 115 or base station 105 may transmit the frame from the wireless device as described with reference to FIG. 2. In certain examples, the operations of block 1115 may be performed by the communications manager 415 as described with reference to FIGS. 4-6 or the communications manager 815 as described with reference to FIGS. 8-9.

Figure 12:
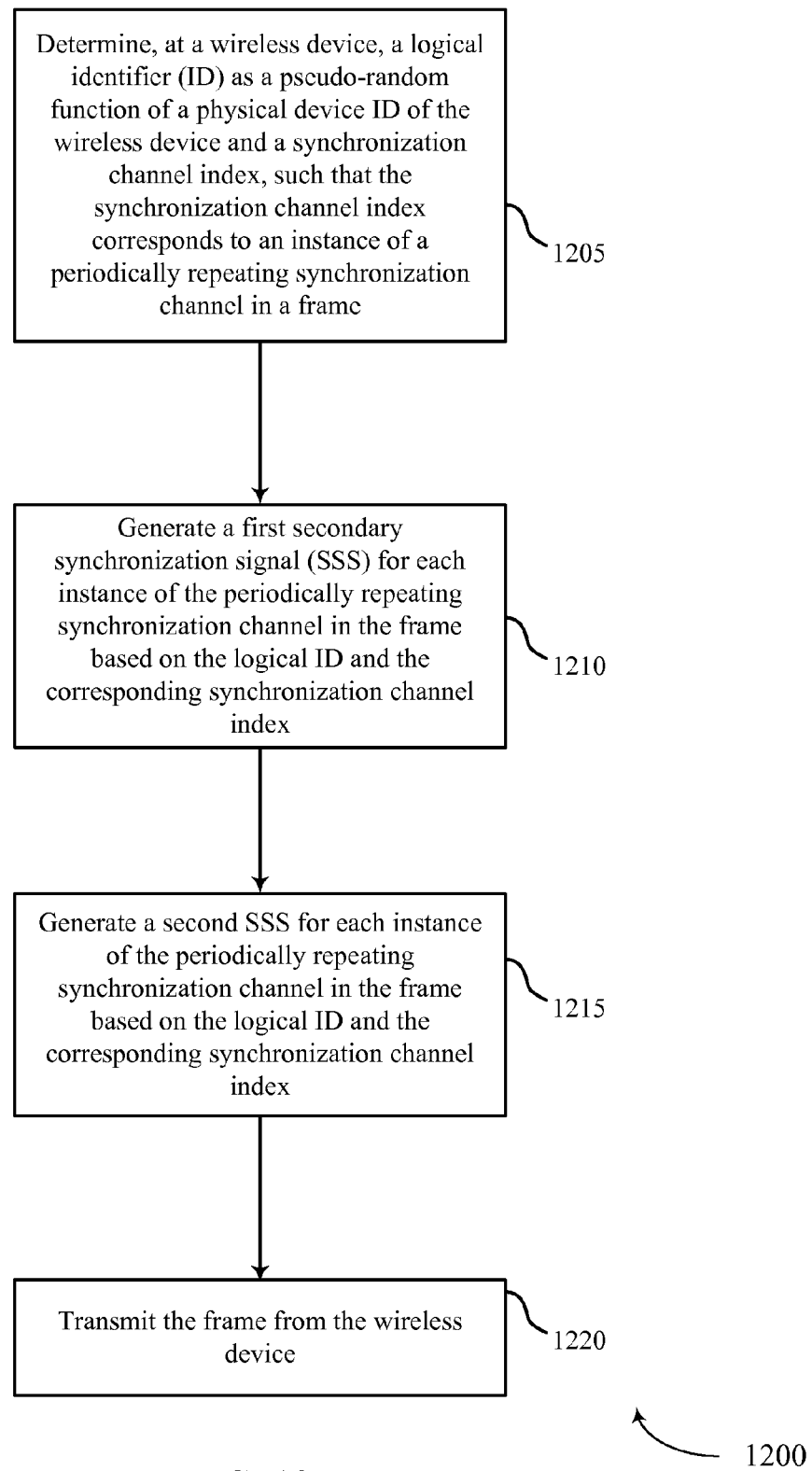

FIG. 12 shows a flowchart illustrating a method 1200 for generating secondary synchronization signals for a synchronization channel in a CIoT system in accordance with various aspects of the present disclosure. The operations of method 1200 may be implemented by a UE 115 or its components or a base station 105 or its components as described with reference to FIGS. 1-10. For example, the operations of method 1200 may be performed by the synchronization channel module 310 as described with reference to FIGS. 3-6 or the base station synchronization channel module 710 as described with reference to FIGS. 7-10. In some examples, a UE 115 or base station 105 may execute a set of codes to control the functional elements of the UE 115 or base station 105 to perform the functions described below. Additionally or alternatively, the UE 115 or base station 105 may perform aspects the functions described below using special-purpose hardware. The method 1200 may also incorporate aspects of method 1100 of FIG. 11.

At block 1205, the UE 115 or base station 105 may determine a logical identifier (ID) as a pseudo-random function of a physical device ID and a synchronization channel index, wherein the synchronization channel index corresponds to an instance of a periodically repeating synchronization channel in a frame as described with reference to FIG. 2. In certain examples, the operations of block 1205 may be performed by the logical ID manager 405 as described with reference to FIGS. 4-6 or the logical ID manager 805 as described with reference to FIGS. 8-9.

At block 1210, the UE 115 or base station 105 may generate a first SSS for each instance of the periodically repeating synchronization channel in the frame based at least in part on the logical ID and the corresponding synchronization channel index as described with reference to FIG. 2. In certain examples, the operations of block 1210 may be performed by the secondary synchronization signal generator 410 as described with reference to FIGS. 4-6 or the secondary synchronization signal generator 810 as described with reference to FIGS. 8-9.

At block 1215, the UE 115 or base station 105 may generate a second SSS for each instance of the periodically repeating synchronization channel in the frame based at least in part on the logical ID and the corresponding synchronization channel index as described with reference to FIG. 2. In certain examples, the operations of block 1215 may be performed by the secondary synchronization signal generator 410 as described with reference to FIGS. 4-6 or the secondary synchronization signal generator 810 as described with reference to FIGS. 8-9.

At block 1220, the UE 115 or base station 105 may transmit the frame, including the first SSS and the second SSS, from the wireless device as described with reference to FIG. 2. In certain examples, the operations of block 1220 may be performed by the communications manager 415 as described with reference to FIGS. 4-6 or the communications manager 815 as described with reference to FIGS. 8-9.

Figure 13:
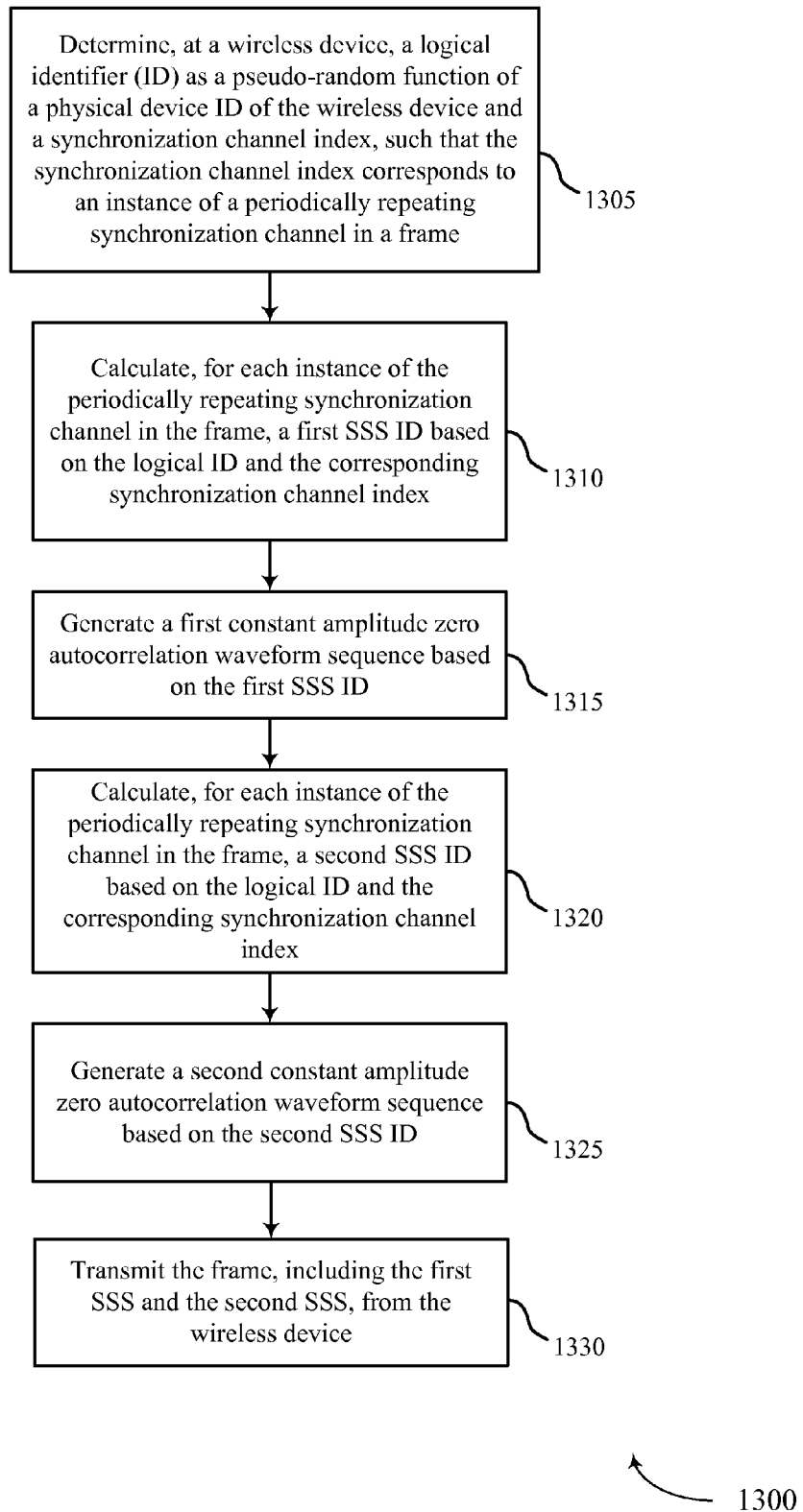

FIG. 13 shows a flowchart illustrating a method 1300 for generating secondary synchronization signals for a synchronization channel in a CIoT system in accordance with various aspects of the present disclosure. The operations of method 1300 may be implemented by a UE 115 or its components or a base station 105 or its components as described with reference to FIGS. 1-10. For example, the operations of method 1300 may be performed by the synchronization channel module 310 as described with reference to FIGS. 3-6 or the base station synchronization channel module 710 as described with reference to FIGS. 7-10. In some examples, a UE 115 or base station 105 may execute a set of codes to control the functional elements of the UE 115 or base station 105 to perform the functions described below. Additionally or alternatively, the UE 115 or base station 105 may perform aspects the functions described below using special-purpose hardware. The method 1300 may also incorporate aspects of methods 1100, and 1200 of FIGS. 11-12.

At block 1305, the UE 115 or base station 105 may determine a logical identifier (ID) as a pseudo-random function of a physical device ID and a synchronization channel index, wherein the synchronization channel index corresponds to an instance of a periodically repeating synchronization channel in a frame as described with reference to FIG. 2. In certain examples, the operations of block 1305 may be performed by the logical ID manager 405 as described with reference to FIGS. 4-6 or the logical ID manager 805 as described with reference to FIGS. 8-9.

At block 1310, the UE 115 or base station 105 may calculate, for each instance of the periodically repeating synchronization channel in the frame, a first SSS ID based at least in part on the logical ID and the corresponding synchronization channel index as described with reference to FIG. 2. In certain examples, the operations of block 1310 may be performed by the secondary synchronization signal calculator 505 as described with reference to FIG. 5 or the secondary synchronization signal calculator 905 as described with reference to FIG. 9.

At block 1315, the UE 115 or base station 105 may generate a first constant amplitude zero autocorrelation waveform sequence based at least in part on the first SSS ID as described with reference to FIG. 2. In some cases, the first SSS is a first Zadoff-Chu sequence whose root index is the first SSS ID. In certain examples, the operations of block 1325 may be performed by the sequence generator 510 as described with reference to FIG. 5 or the sequence generator 910 as described with reference to FIG. 9.

At block 1320, the UE 115 or base station 105 may calculate, for each instance of the periodically repeating synchronization channel in the frame, a second SSS ID based at least in part on the logical ID and the corresponding synchronization channel index as described with reference to FIG. 2. In certain examples, the operations of block 1320 may be performed by the secondary synchronization signal calculator 505 as described with reference to FIG. 5 or the secondary synchronization signal calculator 905 as described with reference to FIG. 9.

At block 1325, the UE 115 or base station 105 may generate a second constant amplitude zero autocorrelation waveform sequence based at least in part on the second SSS ID as described with reference to FIG. 2. In some cases, the second SSS is a second Zadoff-Chu sequence whose root index is the second SSS ID. In certain examples, the operations of block 1325 may be performed by the sequence generator 510 as described with reference to FIG. 5 or the sequence generator 910 as described with reference to FIG. 9.

At block 1330, the UE 115 or base station 105 may transmit the frame, including the first SSS and the second SSS, from the wireless device as described with reference to FIG. 2. In certain examples, the operations of block 1330 may be performed by the communications manager 415 as described with reference to FIGS. 4-6 or the communications manager 815 as described with reference to FIGS. 8-9.

Thus, methods 1100, 1200, and 1300 may provide for generating secondary synchronization signals for a synchronization channel in a CIoT system. It should be noted that methods 1100, 1200, and 1300 describe possible implementation, and that the operations and the steps may be rearranged or otherwise modified such that other implementations are possible. In some examples, aspects from two or more of the methods 1100, 1200, and 1300 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-advanced (LTE-a) are new releases of Universal Mobile Telecommunications System (UMTS) that use E-UTRA. UTRA, E-UTRA, Universal Mobile Telecommunications System (UMTS), LTE, LTE-a, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-a networks, including such networks described herein, the term evolved node B (eNB) may be generally used to describe the base stations. The wireless communications system or systems described herein may include a heterogeneous LTE/LTE-a network in which different types of evolved node B (eNBs) provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 of FIG. 1—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for frequency division duplex (FDD) (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication, comprising:
   determining, at a wireless device, a logical identifier (ID) as a time-varying pseudo-random function of a physical device ID of the wireless device and a synchronization channel index, wherein the synchronization channel index corresponds to an instance of a periodically repeating synchronization channel in a frame;
   generating a first secondary synchronization signal (SSS) sequence for each instance of the periodically repeating synchronization channel in the frame, the first SSS sequence comprising encoded bits indicating the determined logical ID and a corresponding synchronization channel index; and
   transmitting the frame from the wireless device.

2. The method of claim 1, wherein the wireless device is a base station and the periodically repeating synchronization channel is a downlink synchronization channel.

3. The method of claim 1, further comprising:
   generating a second SSS sequence for each instance of the periodically repeating synchronization channel in the frame, the second SSS sequence comprising encoded bits indicating the determined logical ID and the corresponding synchronization channel index.

4. The method of claim 3, further comprising:
   calculating, for each instance of the periodically repeating synchronization channel in the frame, a first SSS ID based at least in part on the logical ID and the corresponding synchronization channel index; and
   generating a first constant amplitude zero autocorrelation waveform sequence based at least in part on the first SSS ID.

5. The method of claim 4, wherein the first SSS sequence is a first Zadoff-Chu sequence whose root index is the first SSS ID.

6. The method of claim 1, wherein, for at least one synchronization channel index, the time-varying pseudo-random function comprises a one-to-one mapping from the physical device ID to the logical ID.

7. The method of claim 4, further comprising:
   calculating, for each instance of the periodically repeating synchronization channel, a second SSS ID based at least in part on the logical ID and the corresponding synchronization channel index; and
   generating a second constant amplitude zero autocorrelation waveform sequence based at least in part on the second SSS ID.

8. The method of claim 7, wherein the second SSS sequence is a second Zadoff-Chu sequence whose root index is the second SSS ID.

9. The method of claim 3, wherein each instance of the periodically repeating synchronization channel comprises a primary synchronization signal (PSS), the first SSS sequence, and the second SSS sequence.

10. The method of claim 9, further comprising:
    calculating a first SSS ID ($SSS_{id1}(X, p)$) according to the formula:

$$SSS_{id1}(X, p) = \left\lfloor \frac{\left\lfloor \frac{N^2}{P} \right\rfloor p + f_p(X)}{N} \right\rfloor$$

wherein X is the physical device ID, p is the synchronization channel index, P is a number of instances of the periodically repeating synchronization channel in the frame, N is a number of different possible sequences for $SSS_{id1}(X, p)$, and $f_p(X)$ is the logical ID associated with $SSS_{id1}(X, p)$; and
    generating the first SSS sequence using the first SSS ID.

11. The method of claim 9, further comprising:
    calculating a second SSS ID ($SSS_{id2}(X, p)$) according to the formula:

$$SSS_{id2}(X, p) = \text{mod}\left(\left\lfloor \frac{N^2}{P} \right\rfloor p + f_p(X), N\right)$$

wherein X is the physical device ID, p is the synchronization channel index, P is a number of instances of the periodically repeating synchronization channel in the frame, N is a number of different possible sequences for $SSS_{id2}(X, p)$, and $f_p(X)$ is the logical ID associated with $SSS_{id2}(X, p)$; and
    generating the second SSS sequence using the second SSS ID.

12. An apparatus for wireless communication, comprising:
    means for determining, at a wireless device, a logical identifier (ID) as a time-varying pseudo-random function of a physical device ID of the wireless device and a synchronization channel index, wherein the synchronization channel index corresponds to an instance of a periodically repeating synchronization channel in a frame;

means for generating a first secondary synchronization signal (SSS) sequence for each instance of the periodically repeating synchronization channel in the frame, the first SSS sequence comprising encoded bits indicating the determined logical ID and a corresponding synchronization channel index; and means for transmitting the frame from the wireless device.

13. The apparatus of claim 12, wherein the wireless device is a base station and the periodically repeating synchronization channel is a downlink synchronization channel.

14. The apparatus of claim 12, further comprising:

means for generating a second SSS sequence for each instance of the periodically repeating synchronization channel in the frame, the second SSS sequence comprising encoded bits indicating the determined logical ID and the corresponding synchronization channel index.

15. The apparatus of claim 14, further comprising:

means for calculating, for each instance of the periodically repeating synchronization channel in the frame, a first SSS ID based at least in part on the logical ID and the corresponding synchronization channel index; and means for generating a first constant amplitude zero autocorrelation waveform sequence based at least in part on the first SSS ID.

16. The apparatus of claim 12, wherein, for at least one synchronization channel index, the time-varying pseudo-random function comprises a one-to-one mapping from the physical device ID to the logical ID.

17. The apparatus of claim 15, further comprising:

means for calculating, for each instance of the periodically repeating synchronization channel, a second SSS ID based at least in part on the logical ID and the corresponding synchronization channel index; and means for generating a second constant amplitude zero autocorrelation waveform sequence based at least in part on the second SSS ID.

18. The apparatus of claim 14, wherein each instance of the periodically repeating synchronization channel comprises a primary synchronization signal (PSS), the first SSS sequence, and the second SSS sequence.

19. An apparatus for wireless communication, comprising:

a processor;

memory in electronic communication with the processor; and instructions stored in the memory and operable, when executed by the processor, to cause the apparatus to:

determine, at a wireless device, a logical identifier (ID) as a time-varying pseudo-random function of a physical device ID of the wireless device and a synchronization channel index, wherein the synchronization channel index corresponds to an instance of a periodically repeating synchronization channel in a frame;

generate a first secondary synchronization signal (SSS) sequence for each instance of the periodically repeating synchronization channel in the frame, the first SSS sequence comprising encoded bits indicating the determined logical ID and a corresponding synchronization channel index; and transmit the frame from the wireless device.

20. The apparatus of claim 19, wherein the wireless device is a base station and the periodically repeating synchronization channel is a downlink synchronization channel.

21. The apparatus of claim 19, wherein the instructions are operable to cause to:

generate a second SSS sequence for each instance of the periodically repeating synchronization channel in the frame, the second SSS sequence comprising encoded bits indicating the determined logical ID and the corresponding synchronization channel index.

22. The apparatus of claim 21, wherein the instructions are operable to cause to:

calculate, for each instance of the periodically repeating synchronization channel in the frame, a first SSS ID based at least in part on the logical ID and the corresponding synchronization channel index; and generate a first constant amplitude zero autocorrelation waveform sequence based at least in part on the first SSS ID.

23. The apparatus of claim 22, wherein the first SSS sequence is a first Zadoff-Chu sequence whose root index is the first SSS ID.

24. The apparatus of claim 19, wherein, for at least one synchronization channel index, the time-varying pseudo-random function comprises a one-to-one mapping from the physical device ID to the logical ID.

25. The apparatus of claim 22, wherein the instructions are operable to cause to:

calculate, for each instance of the periodically repeating synchronization channel, a second SSS ID based at least in part on the logical ID and the corresponding synchronization channel index; and generate a second constant amplitude zero autocorrelation waveform sequence based at least in part on the second SSS ID.

26. The apparatus of claim 25, wherein the second SSS sequence is a second Zadoff-Chu sequence whose root index is the second SSS ID.

27. The apparatus of claim 21, wherein each instance of the periodically repeating synchronization channel comprises a primary synchronization signal (PSS), the first SSS sequence, and the second SSS sequence.

28. The apparatus of claim 27, wherein the instructions are operable to cause to:

calculate a first SSS ID ($SSS_{id1}$ (X, p)) according to the formula:

$$SSS_{id1}(X, p) = \left\lfloor \frac{\left\lfloor \frac{N^2}{P} \right\rfloor p + f_p(X)}{N} \right\rfloor$$

wherein X is the physical device ID, p is the synchronization channel index, P is a number of instances of the periodically repeating synchronization channel in the frame, N is a number of different possible sequences for $SSS_{id1}$ (X, p), and $f_p$ (X) is the logical ID associated with $SSS_{id1}$ (X, p); and generate the first SSS sequence using the first SSS ID.

29. The apparatus of claim 27, wherein the instructions are operable to cause to:

calculate a second SSS ID ($SSS_{id2}$ (X, p)) according to the formula:

$$SSS_{id2}(X, p) = \mathrm{mod}\left(\left\lfloor \frac{N^2}{P} \right\rfloor p + f_p(X), N\right)$$

wherein X is the physical device ID, p is the synchronization channel index, P is a number of instances of the periodically repeating synchronization channel in the frame, N is a number of different possible sequences for $SSS_{id2}$ (X, p), and $f_p$ (X) is the logical ID associated with $SSS_{id2}$ (X, p); and generate the second SSS sequence using the second SSS ID.

30. A non-transitory computer-readable medium storing code for wireless communication, the code comprising instructions executable to:

determine, at a wireless device, a logical identifier (ID) as a time-varying pseudo-random function of a physical device ID of the wireless device and a synchronization channel index, wherein the synchronization channel index corresponds to an instance of a periodically repeating synchronization channel in a frame;

generate a first secondary synchronization signal (SSS) sequence for each instance of the periodically repeating synchronization channel in the frame, the first SSS sequence comprising encoded bits indicating the determined logical ID and a corresponding synchronization channel index; and transmit the frame from the wireless device.

* * * * *